United States Patent Office 3,048,577
Patented Aug. 7, 1962

3,048,577
SUGAR ETHERS
Van R. Gaertner, Dayton, Ohio, assignor to Monsanto Chemical Company, St. Louis, Mo., a corporation of Delaware
No Drawing. Filed Dec. 5, 1958, Ser. No. 778,276
14 Claims. (Cl. 260—209)

The present invention relates to ethers and more particularly deals with ethers of aliphatic polyhydroxy compounds and the method of preparing the same.

According to the invention, there are provided new and valuable hydroxy ethers of non-reducing sugars and sugar alcohols by the reaction of a polyol compound selected from the class consisting of non-reducing sugars and sugar alcohols, with a compound having the formula

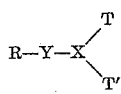

where R is a hydrocarbyl radical of from 8 to 24 carbon atoms, Y is selected from the class consisting of sulfur and oxygen, X is a trivalent paraffinic hydrocarbon radical of from 3 to 5 carbon atoms, T is halogen, T' is —OH, T and T' being respectively attached to carbon atoms of X which are adjacent to each other, but which are not attached to Y, and in which T and T' taken together stand for —O—. Compounds having the above formula may be hydrocarbyloxy- or hydrocarbylthio-substituted halohydrins or hydrocarbyloxy- or hydrocarbylthio-substituted epoxyalkanes, i.e., they may be halohydrin compounds of the formula R—Y—X—halogen
   |
   OH where R, Y and X are as defined above and the halogen and the hydroxy radical are attached to carbon atoms of X which are adjacent to each other but which are not attached to Y. Presently useful compounds may also be hydrocarbyloxy- or hydrocarbylthio-substituted epoxyalkanes, i.e., they may be compounds of the formula

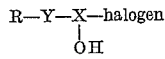

wherein R, Y and X are as defined above and the bivalent —O— atom is attached to carbon atoms of X which are adjacent to each other but which are not attached to Y.

Reaction of the non-reducing sugar or the sugar alcohol with said hydrocarbyloxy- or hydrocarbylthiohaloalkanol or epoxyalkane gives the presently-provided hydroxy ethers, i.e., compounds of the formula

R—Y—X—OZ
   |
   OH where R, Y and X are as herein defined, OH is in the 2-position with respect to —OZ, and OZ is the residue of a polyol selected from the class consisting of non-reducing sugars and sugar alcohols which is linked to X through the oxygen atom of one of the hydroxy groups of said polyol. The presently-provided hydroxy ethers may thus be characterized as hydrocarbyloxy-β-hydroxyalkyl ethers or hydrocarbylthio-β-hydroxyalkyl ethers of a polyol selected from the class consisting of the non-reducing sugars and sugar alcohols wherein the hydrocarbyl radical has from 8 to 24 carbon atoms and the alkyl radical has from 2 to 5 carbon atoms.

Reaction of the substituted halohydrin with the polyol takes place as follows:

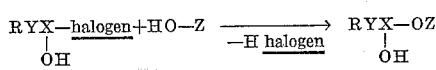

With the substituted epoxyalkane, an addition reaction is involved, thus:

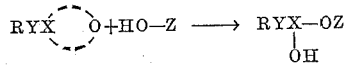

Presently useful non-reducing sugars or sugar alcohols include, e.g., sucrose, trehalose, raffinose, mannitol, sorbitol, dulcitol, etc.

The presently useful chlorohydrins may be compounds selected from the following:

alkyloxy-1-halo-2-alkanols
alkyloxy-2-halo-1-alkanols
alkylthio-1-halo-2-alkanols
alkylthio-2-halo-1-alkanols
alkaryloxy-1-halo-2-alkanols
alkaryloxy-2-halo-1-alkanols
alkarylthio-1-halo-2-alkanols
alkarylthio-2-halo-1-alkanols
cycloalkyloxy-1-halo-2-alkanols
cycloalkyloxy-2-halo-1-alkanols
cycloalkylthio-1-halo-2-alkanols
cycloalkylthio-2-halo-1-alkanols
alkenyloxy-1-halo-2-alkanols
alkenyloxy-2-halo-1-alkanols
alkenylthio-1-halo-2-alkanols
alkenylthio-2-halo-1-alkanols
cycloalkenyloxy-1-halo-2-alkanols
cycloalkenyloxy-2-halo-1-alkanols
cycloalkenylthio-1-halo-2-alkanols
cycloalkenylthio-2-halo-1-alkanols
aralkyloxy-1-halo-2-alkanols
aralkyloxy-2-halo-1-alkanols
aralkylthio-1-halo-2-alkanols
aralkylthio-2-halo-1-alkanols In all of the above, the alkyl, alkaryl, cycloalkyl, alkenyl, cycloalkenyl, and aralkyl radical has from 8 to 24 carbon atoms; the halo substituent is either chlorine, bromine, iodine or fluorine, and the alkanol radical has from 3 to 5 carbon atoms. The presently useful alkyloxy- or alkylthio-substituted chlorohydrins may be chloropropanols of the Structure I or II:

(I)   $RXCH_2CHOHCH_2Cl$
(II)  $RXCH_2CHClCH_2OH$ or they may be the similarly substituted chlorobutanols of the Structure III or IV:

(III) $RXCH_2CH_2CHOHCH_2Cl$
(IV)  $RXCH_2CH_2CHClCH_2OH$ or they may be the similarly substituted chloropentanols of the Structure V or VI:

(V)   $RX(CH_2)_3CHOHCH_2Cl$
(VI)  $RX(CH_2)_3CHClCH_2OH$ or they may be the similarly substituted 1-, 2-, or 3-methyl- or ethylpropanols of, say, the Structure VII, VIII, IX, X or XI:

(VII)  $RXCH_2CHOHCH(CH_3)Cl$
(VIII) $RXCH_2C(CH_3)OHCH_2Cl$
(IX)   $RXCH(CH_3)CHClCH_2OH$
(X)    $RXCH(CH_3)CHOHCH_2Cl$
(XI)   $RXCH(CH_2CH_3)CHOHCH_2Cl$ or they may be the similarly substituted dimethylpropanols of, say, the Structure XII or XIII:

(XII)  $RXC(CH_3)_2CHOHCH_2Cl$
(XIII) $RXC(CH_3)CHOHCH(CH_3)Cl$ or they may be the similarly substituted methylbutanols of, say, the Structure XIV, XV or XVI:

(XIV)     RXCH(CH₃)CH₂CHOHCH₂Cl
(XV)      RXCH₂CH₂C(CH₃)OHCH₂Cl
(XVI)     RXCH₂C(CH₃)CHOHCH₂Cl

In all of the above compounds, R will be a hydrocarbyl radical of from 8 to 24 carbon atoms and X will be oxygen or sulfur. Thus, in the preparation of the presently provided sugar ethers, there may be used as the alkoxychlorohydrin component such compounds as 3-n-dodecyloxy-1-chloro-2-propanol or 3-(4-octylphenoxy)-1-chloro-2-propanol as illustrative of (I); 3-n-octyloxy-2-chloro-1-propanol or 3-(4-dodecylbenzyloxy)-2-chloro-1-propanol as illustrative of (II); 4-(2-dodecenylphenoxy)-1-chloro-2-butanol or 4-n-dodecylthio-1-chloro-2-butanol as illustrative of (III); 4-(2-ethylhexyloxy)-2-chloro-1-butanol or 4-tetradecyloxy-2-chloro-1-butanol as illustrative of (IV); 5-(4-n-dodecylphenoxy)-1-chloro-2-pentanol or 5-(2-ethylhexylthio)-1-chloro-2-pentanol as illustrative of (V); 5-hydroabietyloxy-2-chloro-1-pentanol or 5-tridecyloxy-2-chloro-1-pentanol as illustrative of (VI); 1-nonyloxy-3-chloro-2-butanol or 1-tert-dodecylthio-3-chloro-2-butanol as illustrative of (VII); 3-octadecenyl-oxy-1-chloro-2-methyl-2-propanol or 3-(3-isodecylbenzyl-oxy)-1-chloro-2-methyl-2-propanol as illustrative of (VIII); 3-(4-n-octylcyclohexenyloxy)-2-chloro-1-butanol or 3-(7-ethyl-2-methyl-4-undecyloxy)-2-chloro-1-butanol as illustrative of (IX); 3-dodecyloxy-1-chloro-2-butanol as illustrative of (X); 3-(2-n-octyl-1-naphthyloxy)-1-chloro-2-pentanol or 3-isododecyloxy-1-chloro-2-pentanol as illustrative of (XI); 3-isononyloxy-1-chloro-3-methyl-2-butanol or 3-(dodecyltolyloxy)-1-chloro-3-methyl-2-butanol as illustrative of (XII); 2-n-dodecyloxy-4-chloro-3-pentanol or 2-isotridecylthio-4-chloro-3-pentanol as illustrative of (XIII); 4-(4-dodecenylphenoxy)-1-chloro-2-hydroxypentanol or 4-n-octadecylthio-1-chloro-2-hydroxypentanol as illustrative of (XIV); and 4-isooctyloxy-1-chloro-2-methyl-2-butanol or 4-[2-(4-isononylphenyl)-ethoxy]-1-chloro-2-methyl-2-butanol as illustrative of (XV); and 4-(4-dodecylbenzyloxy)-1-chloro-2-butanol as illustrative of (XVI).

An especially valuable class of chlorohydrins which are useful for the preparation of the presently provided ethers of the non-reducing sugars or sugar alcohols includes the 1-alkoxy-3-chloro-2-propanols, i.e., compounds of the structure $$\text{ROCH}_2\text{CH}-\text{CH}_2$$
$$\quad\quad\quad\;\;\;|\quad\quad\;\;|$$
$$\quad\quad\quad\;\;\text{OH}\quad\text{Cl}$$

wherein R denotes a branched alkyl radical of from 8 to 18 carbon atoms. Examples thereof are 1-tert-octyloxy-3-chloro-2-propanol; 1-(2-ethylhexyloxy)-3-chloro-2-propanol; 1-isononyloxy-3-chloro-2-propanol; branched-chain 1-nonyloxy-3-chloro-2-propanol wherein the nonyl radical is derived from the branched-chain nonanol prepared according to the "Oxo" process from carbon monoxide, hydrogen and diisobutylene; branched-chain 1-decyloxy-3-chloro-2-propanol wherein the decyl radical is derived from branched-chain "Oxo" processed decanol prepared from carbon monoxide, hydrogen and propylene trimer; 1-(2-propylheptyloxy)-3-chloro-2-propanol; 1-(5-ethylnonyloxy)3-chloro-2-propanol; 1-(2,6,8-trimethyl-nonyloxy)-3-chloro-2-propanol; 1-(2-butyloctyloxy)-3-chloro-2-propanol; 1-tert-dodecyloxy-3-chloro-2-propanol; branched-chain 1-tridecyloxy-3-chloro-2-propanol wherein the tridecyl radical is derived from the branched-chain tridecanol according to the "Oxo" process by the high temperature, high pressure reaction of carbon monoxide and hydrogen with an olefin polymer selected from the class consisting of triisobutylene and tetrapropylene; 1-(7-ethyl-2-methyl-4-undecyloxy)-3-chloro-2-propanol; branched-chain 1-hexadecyloxy-3-chloro-2-propanol wherein the hexadecyl radical is derived from a branched-chain "Oxo" process hexadecanol obtained by the reaction of carbon monoxide and hydrogen with propylene pentamer, and 1-tert-octadecyloxy-3-chloro-2-propanol.

As hereinbefore stated, the presently provided hydroxy ethers of non-reducing sugars or sugar alcohols are likewise obtainable from hydrocarbyloxy- or hydrocarbylthio-epoxyalkanes, i.e., compounds of the formula

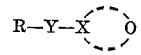

in which R is a hydrocarbyl radical of from 8 to 24 carbon atoms, Y is selected from the class consisting of oxygen and sulfur and X is a trivalent paraffinic hydrocarbon atom and in which the bivalent —O— atom is attached to carbon atoms of X which are adjacent to each other but which are not attached to Y. The epoxyalkanes are readily available by dehydrohalogenation of the corresponding hydrocarbyloxy- or hydrocarbylthio-substituted halohydrins; and while the mechanism through which the present sugar ethers are formed from said substituted halohydrins is not clearly known, it is probable that reaction of the non-reducing sugar or sugar alcohol with said halohydrins for production of the sugar ethers actually proceeds through intermediate formation of the hydrocarbyloxy- or hydrocarbylthio-epoxyalkanes.

The presently useful epoxy compounds include the following classes of compounds:

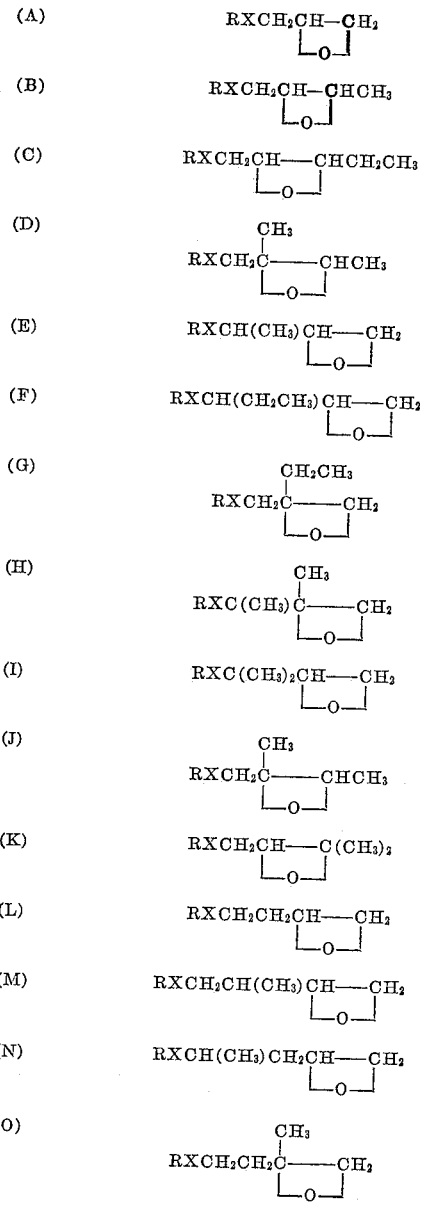

(P)  RXCH₂CH₂CH——CHCH₃
          └—O—┘

(Q)  RXCH₂CH₂CH₂CH——CH₂
              └—O—┘

Examples of compounds having the above structures are for (A) the glycidyl ethers such as 2-ethylhexyl or n-dodecylphenyl glycidyl ether or the corresponding thio ethers such as 1-isodecylthio-2,3-epoxypropane or 1-(4-n-octylbenzylthio)-2,3-epoxypropane; for (B) 1 - (tert-dodecyloxy)-2,3-epoxybutane; for (C) 1-(4-isooctylphenoxy)-2,3-epoxypentane; for (D) 1-isotridecyloxythio-2-methyl-2,3-epoxybutane; for (E) 2 - isononyloxy-3,4-epoxybutane; for (F) 3-dodecenyloxy-3,4-epoxybutane; for (G) 1 - (4-n-hexylcyclohexyloxy)-2-ethyl-2,3-epoxypropane; for (H) 2-dodecylthio-3-methyl-3,4-epoxybutane; for (I) 2-(4-octadecylphenoxy)-2-methyl-3,4-epoxybutane; for (J) 1-hexadecylthio-2-methyl-2,3-epoxybutane; for (K) 1-(4-butylbenzyloxy)-3-methyl-2,3-epoxybutane; for (L) 1-(4-n-octylcyclohexenyloxy)-3,4-epoxybutane; for (M) 1 - (4-biphenylyloxy)-2-methyl-3,4-epoxybutane; for (N) 2-n-dodecylthio-4,5-epoxypentane; for (O) 1-(2-naphthyloxy)-3-methyl - 3,4 - epoxybutane; for (P) 1-isotridecylthio-3,4-epoxypentane; for (Q) 1-hydroabietyloxy-4,5-epoxypentane, etc.

An important class of presently useful epoxy compounds are glycidyl ethers or thio ethers having branched-chain higher alkyl substituents. The presently useful glycidyl ethers may be those obtained by dehydrohalogenation of an appropriate 1-alkoxy-3-chloro-2-propanol. Examples of alkyl glycidyl ethers which are useful for the preparation of valuable ethers of the non-reducing sugars and sugar alcohols are n-octyl, n-nonyl, n-decyl-, n-undecyl, n-dodecyl, n-pentadecyl, n-octadecyl, eicosyl and tetracosyl glycidyl ethers and branched-chain nonyl, decyl, tridecyl and hexadecyl glycidyl ethers wherein the branched-chain alkyl radicals are derived from either "Oxo" process nonanol, "Oxo" process decanol, the "Oxo" process tridecanol or "Oxo" process hexadecanol; and such other branched-chain alkyl glycidyl ethers as 2-ethylhexyl glycidyl ether, tert-octyl glycidyl ether, 2-propylheptyl glycidyl ether, 5-ethylnonyl glycidyl ether, 2,6,8-trimethylnonyl glycidyl ether, 2-butyloctyl glycidyl ether, tert-dodecyl glycidyl ether, tert-pentadecyl glycidyl ether, tert-heptadecyl glycidyl ether and tert-octadecyl glycidyl ether.

Instead of employing the 1-alkoxy-3-chloro-2-propanols for preparing the alkyl glycidyl ethers which are useful for production of the present sugar ethers, I may use the 3-alkoxy-2-chloro-1-propanols, whereby the dehydrohalogenation process likewise effects ring closure to the epoxy group, thus

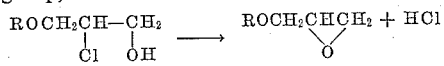

wherein R is an alkyl radical of from 8 to 18 carbon atoms. Thus, from 3-n-octyloxy-2-chloro-2-propanol there is obtained n-octyl glycidyl ether; from 3-(2-ethylhexyloxy)-2-chloro-1-propanol there is obtained 2-ethylhexyl glycidyl ether; from branched-chain 3-nonyloxy-2-chloro-1-propanol wherein the branched-chain nonyl radical is derived from 'Oxo' process nonanol there is obtained the correspondingly branched nonyl glycidyl ether; from 3 - (2 - ethylheptyloxy) - 2 - chloro - 1 - propanol there is obtained 2-ethylheptyl glycidyl ether; from 3-n-decyloxy-2-chloro-1-propanol there is obtained n-decyl glycidyl ether; from 3-n dodecyloxy-2-chloro-1-propanol there is obtained n-dodecyl glycidyl ether; from 1-(2-butyloctyloxy)-2-chloro-1-propanol there is obtained 2-butyloctyl glycidyl ether; from branched-chain 3-tridecyloxy-2-chloro-1-propanol wherein the tridecyl radical is derived from the "Oxo" process tridecanol described above there is obtained the correspondingly branched tridecyl glycidyl ether; from 3-(7-ethyl-2-methyl-4-undecyloxy)-2-chloro-1-propanol there is obtained the 7-ethyl-2-methyl-4-undecyl glycidyl ether; 3-n-hexadecyloxy-2-chloro-1-propanol there is obtained hexadecyl glycidyl ether; and from 3-n-octadecyloxy-2-chloro-1-propanol there is obtained n-octadecyl glycidyl ether.

Glycidic ethers of higher alkyl-substituted phenols are likewise useful for preparing the very valuable sugar ethers. As in the case of the alkyl glycidyl ethers, there may be employed for preparation of alkylphenyl glycidyl ethers either the 1-(alkylaryloxy)-3-chloro-2-propanols or the 3-(alkylaryloxy)-2-chloro-1-propanols, or mixtures thereof. For example, from the 1-(n-octylphenoxy-3-chloro-2-propanol or the 3-(n-octylphenoxy)-2-chloro-1-propanol gives n-octylphenyl glycidyl ether; either the branched-chain 1-(nonylphenoxy)-3-chloro-2-propanol or the branched-chain 3-(nonylphenoxy)-2-chloro-1-propanol wherein the nonyl radical is derived from propylene trimer or "Oxo" process nonanol gives the corresponding branched-chain nonylphenyl glycidyl ether; either the 1-[(2-ethylheptyl)-phenoxy]-3-chloro-2-propanol or the 3[(2-ethylheptyl)phenoxy]-2-chloro-1-propanol gives (2-ethylheptyl)phenyl glycidyl ether; either 1-(decylphenoxy)-3-chloro-2-propanol or 3-(decylphenoxy)-2-chloro-1-propanol gives the corresponding branched-chain decylphenyl glycidyl ether; either the 1-(4-n-dodecylphenoxy)-3-chloro-2-propanol or the 3-(4-n-dodecylphenoxy)-2-chloro-1-propanol gives the 4-n-dodecylphenyl glycidyl ether; either the branched-chain 1 - (2 - tridecylphenoxy) - 3 - chloro - 2 - propanol or the branched-chain 3-(2-tridecylphenoxy)-2-chloro-1-propanol wherein the tridecyl radical is derived from "Oxo" process tridecanol gives the corresponding branched-chain 2-tridecylphenyl glycidyl ether; either the 1-(3-n-octadecylphenoxy) - 3 - chloro - 2 - propanol or 3 - (3 - n-octadecylphenoxy) - 2 - chloro - 1 - propanol gives 3-n-octadecylphenoxy glycidyl ether; branched-chain 1-[α-(β-nonylnaphthyl) - oxy] - 3 - chloro - 2 - propanol or branched - chain 3 - [α - (β - nonylnaphthyl) - oxy] - 2-chloro-1-propanol gives the corresponding branched-chain α-(β-nonylnaphthyl) glycidyl ether; either 1-{-[α-(2 - butyloctyl) - naphthyloxy]} - 3 - chloro - 2 - propanol or 3 - {β - [α - (2 - butyloctyl) - naphthyloxy]} - 2-chloro - 1 - propanol gives β-[α-(2-butyloctyl)-naphthyl] glycidyl ether; either 1 - [4 - (4' - dodecylxenyloxy)] - 3-chloro - 2 - propanol or 3 - [4 - (4' - dodecylxenyloxy)]-2 - chloro - 1 - propanol wherein the dodecyl radical is branched and is derived from propylene tetramer gives the corresponding branched-chain 4-(4'-dodecyl) glycidyl ether, etc.

Highly useful thio ethers of the non-reducing sugars or sugar alcohols are prepared, according to the invention, from either the higher alkyl glycidyl thio ethers or alkylaryl glycidyl thio ethers. Instead of employing alkoxy or alkylaryl oxy-substituted chloropropanols, as in the production of the glycidyl oxygen ethers, there are used the higher alkylthiochloropropanols or arylthiochloropropanols having a higher alkyl substituent in the aryl radical; thus

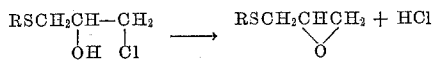

and/or

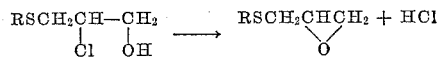

wherein R is either an alkyl radical of from 8 to 18 carbon atoms or an aryl radical of from 6 to 12 carbon atoms carrying as a substituent an alkyl radical of from 8 to 18 carbon atoms. For example, very valuable for the present purpose is the n-octyl glycidyl thio ether which is obtained from either 1-n-octylthio-3-chloro-2-propanol or 3-n-octylthio-2-chloro-1-propanol or a mixture of the same; tert-dodecyl glycidyl thio ether from either 1 - tert - dodecylthio - 3 - chloro - 2 - propanol or 3-tert-dodecylthio-2-chloro-1-propanol or a mixture thereof; n-hexadecyl glycidyl thio ether from either 1-n- hexadecylthio-3-chloro-2-propanol or 3-n-hexadecylthio-2-chloro-1-propanol; n-octadecyl glycidyl thio ether from either 1-n-octadecylthio-3-chloro-2-propanol or 3-n-octadecylthio - 2 - chloro - 1 - propanol; 4 - (2 - ethylhexyl)-phenyl glycidyl thio ether from either 1-[4-(2-ethylhexyl)phenyl]thio-3-chloro-2-propanol or 3{[4-(2-ethylhexyl)phenyl]thio}-2-chloro-1-propanol; branched-chain 4 - nonylphenylglycidyl thio ether wherein the nonyl radical is derive dfrom "Oxo" process nonanol or propylene trimer, said thio ether being derived according to the present process from either the appropriately branched-chain 1-[(4-nonylphenyl)thio]-3-chloro-2-propanol or 3-[(4 - nonylphenyl)thio]-2-chloro-1-propanol; branched-chain 3-decylphenyl glycidyl thio ether from either the appropriately branched - chain 1 - [(3 - decylphenyl)thio] - 3 - chloro - 2 - propanol or 3 - [(3 - decylphenyl)thio]-2-chloro-1-propanol wherein the decyl radical is derived from "Oxo" process decanol; 4-n-dodecylphenyl glycidyl thio ether from either 1-[(4-n-dodecylphenyl)thio] - 3 - chloro - 2 - propanol or 3 - [(4 - n - dodecylphenyl)thio] - 2 - chloro - 1 - propanol; branched-chain 4-tridecylphenyl glycidyl thio ether, wherein the tridecyl radical is derived from "Oxo" process tridecanol, from either the appropriately branched-chain 1-[(4-tridecylphenyl)thio] - 3 - chloro - 2 - propanol or 3 - [(4-tridecylphenyl)thio] - 2 - chloro - 1 - propanol; 2 - tert-hexadecylphenyl glycidyl thio ether from either 1-[(2-tert - hexadecylphenyl)thio] - 3 - chloro - 2 - propanol or 3 - [(2 - tert - hexadecylphenyl)thio] - 2 - chloro-1-propanol; 4 - n - octadecylphenyl glycidyl thio ether from either 1 - [(4 - n - octadecylphenyl) - thio] - 3-chloro - 2 - propanol or 3 - [(4 - n - octadecylphenyl)-thio] - 2 - chloro - 1 - propanol; branched - chain β-(α-tridecylnaphthyl) glycidyl thio ether, wherein the tridecyl radical is derived from "Oxo" process tridecanol, from either the appropriately branched-chain 1-[β-(α-tridecylnaphthyl)thio] - 3 - chloro - 2 - propanol or 3-[β-(α - tridecylnaphthyl)thio] - 2 - chloro - 1 - propanol; 4-(4'-decylxenyl) glycidyl thio ether, from either 1-[4-(4' - decylxenyl)thio] - 3 - chloro - 2 - propanol or 3-[4 - (4' - decylxenyl)thio] - 2 - chloro - 1 - propanol or a mixture thereof.

The substituted halohydrins which are advantageously employed for the preparation of either the sugar ethers directly or for glycidyl ethers of use in preparing the present sugar ethers, are obtainable by the reaction of a suitable 8–24 carbon alkanol or phenol with an epihalohydrin. There is thus obtained an isomeric mixture of alkoxy or aryloxy haloalkanols. Thus, the reaction of a suitable higher branched-chain alkanol with epichlorohydrin gives a predominant amount of the correspondingly branched-chain 1-alkoxy-3-chloro - 2 - propanol together with a minor amount of the correspondingly branched-chain 3-alkoxy-2-chloro-1-propanol. Since either of these isomeric alkoxychloropropanols is converted to the same alkyl glycidyl ethers, the mixture of isomeric chlorohydrins obtained from the alkanol and epichlorohydrins are conveniently usd either for the formation of the alkyl glycidyl ether intermediates or directly with the non-reducing sugars or sugar alcohols to give the presently provided sugar ethers.

Reaction of the non-reducing sugar or sugar alcohol with either the hydrocarbyloxy halohydrin or the hydrocarbyloxy epoxyalkane takes place readily by contacting the sugar compound with the halohydrin or the epoxyalkane advantageously in the presence of a basic catalyst and an inert diluent and allowing the resulting reaction mixture to stand until formation of the ether. Optimum yields are obtained by operating at moderately increased temperatures, say, at temperatures of from 80° C. to 100° C. However, external heating need not be employed. Presently useful basic catalysts include inorganic and organic alkaline materials such as the alkali metal hydroxides and basically reacting salts thereof, e.g., sodium hydroxide, potassium hydroxide, lithium hydroxide, sodium acetate, etc., or organic bases such as trimethylbenzylammonium hydroxide. As diluents there may be employed, e.g., aliphatic and aromatic hydrocarbons such as toluene or hexane, ethers such as isopropyl ether or dioxane and other inert organic liquids such as dimethylformamide and dimethylsulfoxide. When the sugar ethers are prepared from the halohydrin, the reaction takes place with formation of hydrohalide as by-product. Reaction is thus advantageously effected in the presence of a hydrogen halide scavenger, e.g., additional quantities of the base. The by-product hydrogen halide is thereby converted to an alkali metal salt which is readily separated from the desired sugar ether by taking advantage of solubility differences. The presently provided sugar ethers are generally soluble in the lower alcohols and in some instances also insoluble in ether and acetone.

In the epoxyalkane-sugar reaction which takes place by addition of one component to another, there is, of course, no formation of by-product. When the reactants are used in substantially equimolar proportion and reaction is effected in the absence of a diluent, the reaction product generally may be used directly for a variety of industrial purposes. When the reaction is effected in the presence of a diluent, the reaction product comprises a solution of the sugar ether in the diluent. The diluent, as well as any unreacted epoxyalkane, is separated from the reaction mixture by customary isolating procedures, e.g., by distillation, solvent extraction, etc. Advantageously removal of any excess of epoxyalkane is effected by solvent extraction and the diluent by volatilization. The residue thus consists of the substantially pure sugar ether which may be dried, e.g., by spraying, to give powdered products or by vacuum-drying to give waxy to crystalline solids or viscous liquids depending upon the nature of the individual sugar ether.

The present ethers of the non-reducing sugars or sugar alcohols are stable, usually water soluble, friable solids or viscous liquids. They are advantageously employed for a variety of industrial and agricultural purposes and are particularly valuable as surfactants. Some of the sugar ethers possess biological toxicant properties and others, particularly those which are viscous liquids at ordinary room temperatures, are valuable as plasticizing resins for synthetic resins and plastics and as textile adjuvtants, e.g., as softening and antistatic agents. The hydrocarbylthiohydroxyalkyl sugar ethers also find use as lubricant additives.

The present invention is further illustrated by, but not limited to, the following examples:

*Example 1*

To 29.3 g. of chlorotridecyloxypropanol (prepared by reaction of "Oxo" process, branched-chain tridecanol with epichlorohydrin) were added 11 g. of 40% aqueous sodium hydroxide and 50 ml. of dimethyl sulfoxide, and the whole was stirred at room temperature for 30 minutes. To the resulting mixture there was added 37.6 g. of sucrose in 50 ml. of dimethyl sulfoxide and the mixture was heated at 90–95° C. for 3 hours. The reaction temperature was then brought to 120° C. and heating continued at this temperature for 20 minutes. Unreacted glycidyl ether was removed from the reaction mixture by extracting with hexane and the dimethyl sulfoxide was removed by distilling to 100° C./1 mm. The residual material was treated with hot isopropanol and filtered, first while hot and then in the cold. The combined filtrates were concentrated to 20 ml., washed with ether and dried to give as residue the substantially colorless, gum-like O-(2-hydroxy-3-tridecyloxypropyl)sucrose.

The O-(2-hydroxy - 3 - tridecyloxypropyl)sucrose was tested for detersive efficiency employing the method described by Jay C. Harris and Earl L. Brown in the Journal of the American Oil Chemists' Society, 27, 135–143 (1950), in which method the detergency of materials is compared with the detergency of Gardinol WA, a commercial detergent produced by sulfating the mixture of alcohols, principally $C_{12}$, obtained by hydrogenating coconut oil fatty acids. In water of 50 p.p.m. hardness, the present compound was found to have 111% and in water of 300 p.p.m., 106% of the detersive efficiency of Gardinol.

The present compound was also tested in a "built" composition consisting of 40% by weight of a mixture of sodium tripolyphosphate and sodium tetrapyrophosphate, 25% of sodium silicate, 20% soda ash, and 15% of the O-(2-hydroxy-3-tridecyloxypropyl)sucrose. In water of 50 p.p.m. hardness said built composition was found to have 121% and in water of 300 p.p.m. hardness 115% of the detersive efficiency of a composition which was "built" exactly the same way but which contained Gardinol WA instead of the O-(2-hydroxy-3-tridecyloxypropyl)sucrose as the active ingredient.

Evaluation of the wetting-out efficiency of the present O-(2-hydroxy - 3 - tridecyloxypropyl)sucrose showed it to possess very good wetting-out efficiency at low concentrations; thus, in Draves Wetting Test of the American Association of Textile Chemists, the present compound had a speed of wetting of 21 seconds at a concentration of only 0.125%.

The present O-(2-hydroxy-3-tridecyloxypropyl)sucrose also was found to possess very good lathering property. Employing the Ross-Miles Lather Test of the American Society for Testing Materials in water of 50 p.p.m. hardness, the present compound gave a lather height of 16.5 cm. at once, and this value decreased only to 15.4 after 5 minutes.

*Example 2*

A mixture consisting of 37.6 g. of surcrose, 100 ml. of dimethyl sulfoxide and 1 g. of potassium carbonate was heated to 95–100° C. to dissolve the sugar, the mixture was allowed to cool to about 70° C. and there was then added thereto during 30 minutes at a temperature of 70–90° C., 25.6 g. of tridecyl glycidyl ether wherein the tridecyl radical was derived from the "Oxo" process tridecanol. When all of the ether had been added, the whole was treated with 0.5 ml. of 40% aqueous sodium hydroxide and heated, with stirring, for an additional 2 hours at a temperature of about 100° C. (up to 120° C. for a few minutes). The resulting reaction mixture was extracted with hexane, the dimethyl sulfoxide was aspirated and the residue was stirred with 200 ml. of isopropanol and filtered while hot to remove unreacted sucrose. Upon aspirating isopropanol from the filtrate, there was obtained as residue 35.8 g. of the viscous substantially pure O-(2-hydroxy-3-tridecyloxypropyl)sucrose.

*Example 3*

A mixture consisting of 25.1 g. of isodecyloxychloropropanol (wherein the isodecyl radical is derived from the "Oxo" process decanol), 25 ml. of dimethyl sulfoxide and 10.5 g. of 40% aqueous sodium hydroxide was stirred at 30° C. for 2 hours. The whole was then heated to 95–100° C. and there was added thereto a hot solution of 37.6 g. of sucrose in 75 ml. of dimethyl sulfoxide. After stirring the whole for 4 hours at a temperature of 95–100° C., the reaction mixture was allowed to cool and extracted with hexane, and the residue was aspirated to remove the dimethyl sulfoxide while being heated to 100° C. at below 1 mm. The hot gummy residue was taken up with 200 ml. of boiling isopropanol, cooled, filtered twice and concentrated to about 100 g. by means of an aspirator. The concentrated solution was then diluted with acetone to one liter, and the precipitated gum was washed by decantation with acetone and vacuum dried. Repeated washing of the dried product with ether and final drying of the washed product gave the substantially pure gum-like O-(2-hydroxy-3-isodecyloxypropyl)sucrose which analyzed as follows:

|  | Found | Calcd. for $C_{25}H_{49}O_{13}$ |
|---|---|---|
| Percent C | 52.55 | 53.9 |
| Percent H | 8.80 | 8.70 |

*Example 4*

A mixture consisting of 68.4 g. of sucrose, 300 ml. of dimethyl sulfoxide and 6 g. of potassium carbonate was warmed in order to dissolve the sucrose and 25.6 g. of tridecyl glycidyl ether (wherein the tridecyl radical is derived from "Oxo" process tridecanol) was added thereto. After heating the whole, with stirring, to a temperature of 85–90° C., a total of 3.0 ml. of 50% aqueous potassium hydroxide was added thereto in 4–5 drop portions at intervals during a 3-hour period. Heating with stirring at a temperature of about 85° C. was continued for a total heating period of 6.5 hours. At this point, addition of a sample of the reaction mixture to water gave a very high, stable foam. Unreacted glycidyl ether was removed from the reaction product by extracting with ether, and the residual dimethyl sulfoxide layer was aspirated to near dryness at a temperature of about 100° C./1 mm. The dried product was diluted with isopropanol, heated and decanted and the residue thus obtained was treated in the Waring Blendor with additional isopropanol. Filtration of the treated residue, concentration of the combined washings and filtrates to near dryness and repeated washing of the dried material with ether gave, after drying the washed product at a temperature of up to 100° C. at below 1 mm., 45.7 g. (76.2% theoretical yield) of the substantially pure light amber, gum-like O-(2-hydroxy-3-tridecyloxypropyl)sucrose.

*Example 5*

To a solution of 37.6 g. of sucrose in 100 ml. of dimethylformamide, containing 1 g. of potassium carbonate, there was added 21.4 g. of isodecyl glycidyl ether wherein the isodecyl radical is derived from "Oxo" process decanol. The whole was heated with stirring at about 100° C. for 2 hours and 15 minutes and there was then added an additional 37.6 g. of sucrose. Heating and stirring was continued for 45 minutes at 100–105° C. After being allowed to stand at room temperature, the sugar which had crystallized out was filtered off and the precipitate washed with 200 ml. of isopropanol. The combined filtrates were distilled at the aspirator to near dryness and digested with hot isopropanol. The solid which formed upon cooling was filtered off and the filtrate distilled to dryness. After washing with ether and drying to 120° C./1 mm., there was obtained as residue the very viscous, substantially pure O-(2-hydroxy - 3 - isodecyloxypropyl)-sucrose.

Testing of the lathering efficiency of the O-(2-hydroxy-3-isodecyloxypropyl)sucrose by the Ross-Miles Lather Test of the American Society for Testing Materials in water of 50 p.p.m. hardness gave at once a lather height of 21.4 ml., and this value was not changed after standing for 5 minutes.

*Example 6*

A mixture consisting of 37.6 g. of sucrose in 100 ml. of dimethyl sulfoxide was heated at 90° C. until the sucrose had dissolved. To the resulting solution there was added, dropwise, 24.2 g. of 2-butyloctyl glycidyl ether. Heating, with stirring, was continued for 6 hours, during which time 3 ml. of 40% aqueous sodium hydroxide was added, portion-wise, in 30 minute intervals. Heating was then continued for another 7 hours. After allowing the resulting reaction mixture to cool, it was extracted with hexane and evaporated to dryness with stirring at 95° C./0.5 mm. The residue was stirred with hot isopropanol and filtered. Treatment of the filtrate with charcoal, filtration and concentration to dryness gave as residue 48.5 g. of a very light tan gum which upon drying in the vacuum oven for about 18 hours at a temperature of 56° C. gave the substantially pure O-[3-(2-butyloctyloxy)-2-hydroxypropyl]sucrose which analyzed as follows:

|  | Found | Calcd. for $C_{27}H_{52}O_{13}$ |
| --- | --- | --- |
| Percent C | 55.4 | 55.3 |
| Percent H | 9.31 | 8.97 |

*Example 7*

To a warmed solution of 68.4 g. (0.20 mole) of sucrose and 300 ml. of dimethyl sulfoxide containing 6.0 g. of potassium carbonate there was added, with stirring at 85–90° C., 21.3 g. of 2-butyloctyl glycidyl ether. To the heated mixture there was then added, dropwise during one hour, 2.0 ml. of 50% aqueous potassium hydroxide and heating, with stirring at about 90 C., was continued for about 8.5 hours. Unreacted glycidyl ether was recovered by extracting the reaction mixture with hexane and the dimethyl sulfoxide was removed from the residue by aspirating to a pot temperature of 100° C. The residual hot fluid mass was slowly added to cold isopropanol with agitation in the Waring Blendor, and filtered. Concentration to dryness, solution of the dried product in isopropanol and subsequent aspiration and drying gave as residue 37.5 g. (91.2% theoretical yield) of the substantially pure O-[3-(2-butyloctyloxy)-2-hydroxypropyl]sucrose.

Evaluation of the detersive efficacy of the O-[3-(2-butyloctyloxy)-2-hydroxypropyl]sucrose by the method described in Example 1 showed the compound to have 100% the detergency of "Gardinol WA" in water of 50 p.p.m. hardness. Testing of the wetting-out properties by the procedure of Example 1 gave a speed of wetting of 5.3 seconds at an 0.5% concentration, 7.3 seconds at an 0.25% concentration and 20.1 at an 0.125% concentration.

*Example 8*

Dodecyloxychloropropanol (25.8 g., prepared by reaction of n-dodecyl alcohol with epichlorohydrin) was treated with 20 g. of 40% aqueous sodium hydroxide and 20 ml. of dimethyl sulfoxide. The mixture was shaken at intervals for 30 minutes in a separatory funnel, extracted with hexane and the extract was dried over sodium sulfate and aspirated. To the residue there was added 68.4 g. of sucrose, 250 ml. of dimethyl sulfoxide, 6.0 g. of potassium carbonate and 3.0 ml. of 50% aqueous potassium hydroxide. The whole was then heated, with stirring, for 11 hours at a temperature of 85–90° C. Unreacted oils were removed by extracting with hexane. The remaining layer was aspirated to remove dimethyl sulfoxide, the residue was treated with isopropanol and filtered. Drying of the filtrate by heating to 100° C./1 mm., washing with ether, and subsequent drying gave as residue the substantially pure O-(3-n-dodecyloxy-2-hydroxypropyl)sucrose.

Determination of the lathering property of the O-(3-n-dodecyloxy-2-hydroxypropyl)sucrose by the method described in Example 1, gave the following amounts of lather:

50 p.p.m. water hardness:
  At once—14.8 cm.
  After 5 minutes—14.8 cm.
300 p.p.m. water hardness:
  At once—15.1 cm.
  After 5 minutes—14.7 cm.

*Example 9*

To a solution of 37.6 g. of sucrose in 100 ml. of dimethyl sulfoxide heated to about 100° C., there was first added 0.3 ml. of 40% aqueous sodium hydroxide and then, dropwise during 20 minutes, 37.8 g. of Lorol No. 5 glycidyl ether (prepared from epichlorohydrin and Lorol No. 5, a mixture of higher normal alkanols consisting predominantly of lauryl alcohol). An additional 0.2 ml. of sodium hydroxide was then added to the whole and heating, with stirring, was continued for 16 hours at about 100° C. At the end of that time, the reaction mixture was allowed to cool and extracted with hexane in order to remove unreacted glycidyl ether. The residual layer was aspirated to about 100° C. at below 1 mm. to remove dimethyl sulfoxide, and the gum-like material which remained was heated and stirred for about 4 hours with isopropanol. After filtering the solution, treating the filtrate with charcoal and aspirating to 120° C., the product was washed repeatedly with ether and dried to give the tan substantially pure O-(2-hydroxy-3-loroxy-1-propyl)sucrose.

*Example 10*

To a mixture consisting of 37. g. of sucrose and 100 g. of dimethyl sulfoxide there was added, with stirring, 25.6 g. of tridecyl glycidyl ether at a temperature of 85–90° C. The resulting mixture was then heated at this temperature for 2 hours while 1.5 ml. of 40% aqueous sodium hydroxide was added thereto, portion-wise, at 20–30 minute intervals. Heating and stirring were continued for a total of 9 hours. At the end of this time the mixture was allowed to cool, unreacted glycidyl ether was removed by extracting with hexane, and dimethyl sulfoxide was removed by distillation to 100° C./1 mm. The residue was dissolved in isopropanol, filtered in the cold, the precipitate washed with hot methanol, and the combined filtrates (after filtration to remove some sucrose) were distilled to near dryness. The substantially dry product was redissolved in isopropanol, refiltered, and the filtrate dried to give as residue 43.2 g. of the substantially pure O-(2-hydroxy-3-tridecyloxypropyl)sucrose.

*Example 11*

A solution of 37.6 g. (0.11 mole) of sucrose in 100 ml. of dimethyl sulfoxide was prepared by heating together these quantities of the two materials, and after cooling to 50° C., 18.6 g. (0.10 mole) of 2-ethylhexyl glycidyl ether was added to the cooled solution. The resulting mixture was then treated with 1 ml. of 40% aqueous sodium hydroxide and the whole was heated, with stirring, at 85° C. for 10 hours. At the end of that time, the dimethyl sulfoxide and unreacted glycidyl ether was removed by distillation to 110° C./1 mm. The residue was dissolved, with heating and stirring, in 200 ml. of isopropanol and after cooling, the unconverted sucrose was removed from the solution by filtration. The filtrate was washed and diluted with about 200 ml. of water and extracted with hexane. The aqueous layer thus obtained was dried, first by distillation with isopropanol and finally to dryness to give as residue 40.0 g. (75.7% theoretical yield) of the substantially pure O-[3-(2-ethylhexyloxy)-2-hydroxypropyl]sucrose, a light amber, rather resinous product which foams in water.

*Example 12*

To a mixture consisting of 68.4 g. of sucrose and 200 ml. of dimethyl sulfoxide there was added, at 50–55° C., 25.6 g. of tridecyl glycidyl ether and 3 g. of potassium carbonate. The tridecyl radical of the glycidyl ether was derived from the "Oxo" process tridecanol. The whole was heated to a temperature of 90–95° C. and stirred vigorously as 3 ml. of 40% aqueous sodium hydroxide was added, dropwise, over a period of 2 hours. Heating, with stirring, was continued for another 2 hours. The reaction mixture was then allowed to cool, neutralized with acetic acid and extracted with hexane to remove unreacted glycidyl ether. Removal of dimethyl sulfoxide was effected by distillation. The residue was treated with boiling isopropanol, filtered and the isopropanol stripped from the filtrate. The residue thus obtained was washed with ether and dried to give the substantially pure O-(2-hydroxy-3-tridecyloxypropyl)sucrose.

Example 13

A mixture consisting of 37.6 g. of sucrose, 6 g. of potassium carbonate and 100 ml. of dimethyl sulfoxide was heated to 75° C. and there was added thereto, 26.5 g. of tridecyl glycidyl ether (wherein the tridecyl radical was derived from "Oxo" process tridecanol) and 2.0 g. of 50% aqueous potassium hydroxide. Heating, with stirring, was continued for 2.5 hours at 70–90° C.; and, at the end of this time, the temperature was raised to 142° C. within 15 minutes. After allowing the resulting reaction mixture to cool, it was extracted with hexane to remove unreacted glycidyl ether and distilled to remove dimethyl sulfoxide. The residue was taken up with hot isopropanol, treated with charcoal, filtered and dried to give 47.4 g. of the substantially pure O-(2-hydroxy-3-tridecyloxypropyl)sucrose.

Example 14

To a warmed (70° C.) mixture consisting of 51.3 g. (0.15 mole) of sucrose, 250 ml. of dimethyl sulfoxide and 6 g. of potassium carbonate there was added 25.6 g. (0.10 mole) of tridecyl glycidyl ether (wherein the tridecyl radical is derived from "Oxo" process tridecanol), and the whole was treated, dropwise over a period of 2 hours, with 2.0 ml. of 50% aqueous potassium hydroxide. Heating was continued for a total of 4.5 hours. The resulting reaction mixture was extracted with hexane to remove unreacted glycidyl ether, the dimethyl sulfoxide was removed by aspiration, and the residue was poured into a Waring Blendor containing about 300 ml. of cold isopropanol. Residual material was removed from the reaction vessel with hot isopropanol and the combined material was stirred in the Blendor and filtered to remove sucrose. Removal of the isopropanol by aspiration, washing the residue by decantation 4 times with ether and drying with aspiration to 100° C. gave as residue 25.3 g. of the gum-like, ether-insoluble O-(2-hydroxy-3-tridecyloxypropyl)sucrose. Based on the recovered glycidyl ether (14.4 g.) a 96.3% yield of the ether was obtained.

Example 15

Branched-chain hexadecyl glycidyl ether (29.8 g., wherein the hexadecyl radical was derived from "Oxo" process hexadecanol) was added, dropwise, to a mixture consisting of 37.6 g. of sucrose in 100 ml. of dimethyl sulfoxide and 2.0 ml. of 40% aqueous sodium hydroxide at a temperature of 90–95° C. and heating and stirring at this temperature were conducted for a total of 12 hours. After allowing the reaction mixture to cool, it was extracted with hexane to remove any unreacted glycidyl ether and the dimethyl sulfoxide was aspirated at 100° C. at below 1 mm. Boiling isopropanol was added to the hot residue; and, after cooling and filtering with charcoal, the filtrate was heated to dryness at 120° C. at below 1 mm. to obtain as residue 52.5 g. of the substantially pure O-(3-hexadecyloxy-2-hydroxypropyl)sucrose. A sample of the product was redried in a vacuum oven at 56° C. and analyzed 59.09% carbon as against 58.1%, the calculated value.

Example 16

This example shows preparation of a sugar ether from an alkyl glycidyl ether wherein the alkyl radical was derived from a mixture of n-$C_{16-18}$ alcohols known to the trade as "Adol 65."

To a mixture consisting of 68.4 g. (0.20 mole) of sucrose, 250 ml. of dimethyl sulfoxide and 6.0 g. of potassium carbonate (heated to dissolve the sucrose), there was added 31.5 g. of said alkyl glycidyl ether. The whole was brought to a temperature of 85–90° C. and to the thus heated mixture there was added, with stirring during 2 hours, 2.5 ml. of 50% aqueous potassium hydroxide. Heating was continued at 85–90° C. for a total of 11 hours. Unreacted glycidyl ether was removed from the resulting mixture by extracting with hexane, the dimethyl sulfoxide was removed by aspiration, and the residue was taken up in isopropanol and concentrated to near dryness. Repeated treatment of the substantially dry product with 500 ml. of ether, precipitation of the product by addition of about 25 ml. of hexane and removal of the upper ether-hexane layer gave an ether insoluble product. This was taken up in isopropanol and concentrated to dryness at 90° C./0.2 mm. to give 39.4 g. of the tan, waxy O-(3-alkoxy-2-hydroxypropyl)sucrose wherein the alkoxy radical is derived from the mixture of n-$C_{16-18}$ alcohols.

Example 17

This example describes the preparation of a sugar ether from hydroabietyl glycidyl ether obtained from technical hydroabietyl alcohol.

To a mixture consisting of 37.6 g. of sucrose, 100 ml. of dimethyl sulfoxide and a few drops of 40% aqueous sodium hydroxide there was added, with stirring during 90 minutes at a temperature of 90–95° C., 34.8 g. of the hydroabietyl glycidyl ether. At intervals, the remainder of 2.0 ml. of the aqueous sodium hydroxide was also added during the 90 minute period. Heating and stirring at 90–95° C. were then continued for another 10 hours. After cooling, unreacted glycidyl ether was extracted with about 300 ml. of hexane, the dimethyl sulfoxide was removed by aspiration below 100° C. and the residue was stirred for 3 hours with hot isopropanol. The resulting solution was cooled, filtered, the filtrate heated with charcoal, filtered again and the filtrate concentrated to about 100 ml. Addition of ether to the concentrated product resulted in precipitation. The whole was allowed to stratify and the ether layer decanted. The thick residue was washed with ether, redissolved in 50 ml. of isopropanol, reprecipitated with ether and the ether layer again decanted. The residue thus obtained was dried by aspiration to give the white, powdery O-(3-hydroabietoxy-2-hydroxypropyl)sucrose.

Determination of the detersive efficiency of the O-(3-hydroabietoxy-2-hydroxypropyl)sucrose by the evaluation procedure of Example 1 gave 107% of the detersive efficiency of "Gardinol" WA when tested in the "built" composition in water of 50 p.p.m. hardness.

Example 18

To a stirred mixture of 37.6 g. of sucrose, 100 ml. of dimethyl sulfoxide and 27.6 g. (0.10 mole) of nonylphenyl glycidyl ether, there was added, dropwise during 4 hours at 85–90° C., 2 ml. of 40% aqueous sodium hydroxide. Heating and stirring were continued for 11 hours. The resulting reaction mixture was cooled, extracted with hexane to remove unreacted glycidyl ether, and aspirated to 100° C. at below 1 mm. to remove the dimethyl sulfoxide. The residue thus obtained was stirred with hot isopropanol, repeatedly treated with charcoal and filtered, and the filtrate heated to substantial dryness at 160° C. at below 1 mm. There was thus obtained as residue 42 g. of the light, tan, substantially pure O-[2-hydroxy-3-(nonylphenoxy)-propyl]sucrose.

Example 19

To a solution consisting of 51.3 g. (0.15 mole) of sucrose, 300 ml. of dimethyl sulfoxide and 6.0 g. of potassium carbonate there was added 23.9 g. of dodecylphenyl glycidyl ether, during a period of 90 minutes at a temperature of 85–90° C. The resulting mixture was treated, with stirring, with 3.0 ml. of 50% aqueous potassium hydroxide and heating, with stirring, was continued for a total of 12 hours at 85–90° C. Upon cooling the reaction mixture, unreacted glycidyl ether was extracted therefrom with hexane, the dimethyl sulfoxide was removed by aspiration, the residue taken up with isopropanol and filtered with charcoal, and the filtrate concentrated to dryness. Upon repeated washing of the dried product with ether, there was obtained the substantially pure O-[3-(dodecylphenoxy)-2-hydroxypropyl]sucrose.

Determination of the detersive efficiency of the O-[3-(dodecylphenoxy)-2-hydroxypropyl]sucrose by the method of Example 1 gave 110% of the detersive efficiency of Gardinol in water of 50 p.p.m. hardness. Testing of the "built" composition as in Example 1 gave a value of 102% in the same water hardness.

*Example 20*

This example describes the preparation of a sugar ether from 3-tert-dodecylthio-1,2-epoxypropane.

A mixture consisting of 37.6 g. of sucrose, 100 ml. of dimethyl sulfoxide and 25.8 g. (0.10 mole) of said epoxy compound was stirred at 85–90° C. while adding thereto about 3 drops of 40% aqueous sodium hydroxide at 30-minute intervals during a time of 6 hours. Heating, with stirring, was then continued for an additional 3 hours at 85–90° C. The reaction mixture was then allowed to stand at room temperature overnight, the unreacted epoxy compound was extracted therefrom with hexane and the dimethyl sulfoxide removed by aspiration. The residue was stirred and heated for several hours with isopropanol to solution, and the solution thus obtained was filtered and refiltered with charcoal and the filtrate taken to dryness at 100° C./4.1 mm. There was thus obtained the substantially pure O-(3-dodecylthio-2-hydroxypropyl) sucrose.

*Example 21*

3-dodecylthio-1,2-epoxypropane (25.8 g.) was added to a solution of 68.4 g. of sucrose in 300 ml. of dimethyl sulfoxide containing 6.0 g. of potassium carbonate at a temperature of 85–90° C. To the resulting mixture there was added 2.5 ml. of 50% aqueous potassium hydroxide during a period of 3 hours. Heating was then continued for about 5.5 hours at a temperature of 90° C. The resulting reaction mixture was allowed to cool and then filtered with the aid of a filter aid. Removal of unreacted glycidyl ether from the filtrate was effected by extracting with hexane and the dimethyl sulfoxide was removed by aspiration to 100° C./2.0 mm. The hot residue was then poured into cold isopropanol, stirred in the Waring Blendor, filtered and rinsed 3 times with isopropanol. After decolorizing with charcoal, the washed product was concentrated to near dryness, rinsed 4 times with 100 ml. portions of ether and dried to a pot temperature of 100° C./less than 2 mm. There was thus obtained as residue 39 g. of the viscous O-(3-tert-dodecylthio-2-hydroxypropyl)sucrose.

*Example 22*

This example describes the preparation of an alkoxy hydroxy alkyl ether of dextran (Laros, Grade HH, M. W. Aver. 200,000–250,000, 162.14 per anhydroglucose unit).

2-butyloctyl glycidyl ether (17.0 g., 0.07 mole) was added, dropwise, to a solution consisting of 32.4 g. (0.2 mole) of the dextran, 150 ml. of dimethyl sulfoxide and a few drops of 40% aqueous sodium hydroxide at a temperature of 90–95° C. When all of the glycidyl ether had been added, the remainder of 2 ml. of the aqueous alkali was added, dropwise during 2 hours, at the same temperature and heating with stirring was continued for an additional 8 hours. Upon cooling, the reaction mixture was freed of unreacted glycidyl ether by extracting with hexane and dimethyl sulfoxide by aspiration to about 100° C. at below 0.5 mm. The residual product was washed repeatedly with hot propanol and dried in a vacuum oven at below 50° C. to give the O-[3-(2-butyloctyloxy)-2-hydroxypropyl]dextran.

*Example 23*

To a solution consisting of 10.0 g. (0.11 mole) of D-sorbitol, 100 ml. of dimethyl sulfoxide and 5 drops of 40% aqueous sodium hydroxide heated to 90–95° C., there was added, dropwise with stirring 25.1 g. (0.10 mole) of isodecyl glycidyl ether wherein the isodecyl radical is derived from "Oxo" process decanol. Addition of the glycidyl ether was conducted over a 90-minute period. At the end of this time, heating was continued at 90–95° C. for an additional 5 hours while adding to the reaction mixture the remainder of 2 ml. of the 40% aqueous sodium hydroxide. When all of the sodium hydroxide had been added, the reaction mixture was heated with stirring for an additional 7 hours at 95–100° C. The cooled reaction mixture was extracted with hexane in order to remove unreacted glycidyl ether, aspirated to a pot temperature of 115° C./20 mm. in order to remove the dimethyl sulfoxide and the residue stirred with isopropanol (200 ml.) with heating. Filtering with charcoal and evaporating the filtrate to dryness gave as residue 34 g. of the substantially pure O-(2-hydroxy-3-isodecyloxypropyl)sorbitol, which upon redrying at 56° C., analyzed as follows:

|  | Found | Calcd. for $C_{19}H_{40}O_8$ |
| --- | --- | --- |
| Percent C | 58.87 | 57.5 |
| Percent H | 10.01 | 10.2 |

What is claimed:

1. An ether of the formula

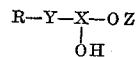

in which R is a hydrocarbyl radical of from 8 to 24 carbon atoms, Y is selected from the class consisting of sulfur and oxygen, X is a trivalent paraffinic hydrocarbon radical of from 3 to 5 carbon atoms carrying —OH at the 2-position thereof with respect to —OZ and OZ is the residue of a polyol selected from the class consisting of non-reducing sugars and sugar alcohols which is linked to X through the oxygen atom of one of the hydroxy groups of said polyol.

2. An ether of the formula

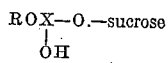

in which R is a hydrocarbyl radical of from 8 to 24 carbon atoms, and X is a trivalent paraffinic hydrocarbon radical of from 3 to 5 carbon atoms carrying —OH radical vicinal to the —O.-sucrose group.

3. An O-(3-alkoxy-2-hydroxypropyl)sucrose wherein the alkoxy radical has from 8 to 24 carbon atoms.

4. An O-(3-alkoxy-2-hydroxypropyl)sorbitol in which the alkoxy radical has from 8 to 24 carbon atoms.

5. An O-(3-(alkylaryloxy)-2-hydroxypropyl)sucrose wherein the alkylaryl radical has from 7 to 24 carbon atoms.

6. O-(2-hydroxy-3-tridecyloxypropyl)sucrose.
7. O-(3-n-dodecyloxy-2-hydroxypropyl)sucrose.
8. O-[-(dodecylphenoxy)-2-hydroxypropyl]sucrose.
9. O-(2-hydroxy-3-isodecyloxypropyl)sucrose.
10. O-(3-hydroabietoxy-2-hydroxypropyl)sucrose.

11. The method which comprises reacting, in the presence of an inert diluent and a basic catalyst selected from the class consisting of alkali metal hydroxides and basically reacting salts thereof, a polyol compound selected from the class of non-reducing sugars and sugar alcohols with a substantially equimolar quantity of a compound having the formula

where R is a hydrocarbyl radical of from 8 to 24 carbon atoms, Y is selected from the class consisting of sulfur and oxygen, X is a trivalent paraffinic hydrocarbon radical of from 3 to 5 carbon atoms, T is halogen, T' is —OH, T and T' being respectively attached to carbon atoms of X which are adjacent to each other but which are not attached to Y, and recovering from the resulting reaction product

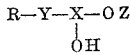

in which R, Y and X are as herein defined, —OH is vicinal with respect to —OZ and OZ is the residue of said polyol which is linked to X through the oxygen atom of one of the hydroxy groups of the polyol.

12. The method which comprises reacting sucrose, in the presence of dimethylsulfoxide as an inert diluent and a basic catalyst selected from the class consisting of alkali metal hydroxides and basically reacting salts thereof, with a substantially equimolar quantity of a halohydrin of the formula

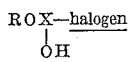

in which R is a hydrocarbyl radical of from 8 to 24 carbon atoms, X is a trivalent paraffinic hydrocarbon radical of from 3 to 5 carbon atoms, and wherein the —OH radical and the halogen are respectively attached to carbon atoms of X which are adjacent to each other but which are not attached to —O—, and recovering from the resulting reaction product a sucrose ether of the formula

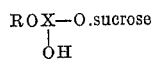

wherein R and X are as herein defined and —OH is vicinal to —OZ.

13. The method which comprises reacting sucrose, in the presence of dimethylsulfoxide as an inert diluent and a basic catalyst selected from the class consisting of alkali metal hydroxides and basically reacting salts thereof, with a substantially equimolar quantity of a 3-alkoxy-1,2 chloropropanol having from 8 to 24 carbon atoms in the alkoxy radical and recovering from the resulting reaction product an O-(3-alkoxy-2-hydroxypropyl)sucrose wherein the alkoxy group is as herein defined.

14. The method which comprises heating sucrose, in the presence of dimethylsulfoxide as an inert diluent and a basic catalyst selected from the class consisting of alkali metal hydroxides and basically reacting salts thereof, with a substantially equimolar quantity of chlorotridecyloxypropanol obtained by the reaction of epichlorohydrin with "Oxo" process, branched-chain tridecanol and recovering from the resulting reaction product O-(2-hydroxy-3-tridecyloxypropyl)sucrose wherein the tridecyl radical is derived from said "Oxo" process tridecanol.

References Cited in the file of this patent
UNITED STATES PATENTS

| | | |
|---|---|---|
| 2,069,336 | Schmidt et al. | Feb. 2, 1937 |
| 2,148,437 | Coleman et al. | Feb. 28, 1939 |
| 2,327,053 | Marple et al. | Aug. 17, 1943 |
| 2,574,544 | DeGroote | Nov. 13, 1951 |
| 2,778,855 | Shokal et al. | Jan. 22, 1957 |

UNITED STATES PATENT OFFICE
CERTIFICATE OF CORRECTION

Patent No. 3,048,577                    August 7, 1962

Van R. Gaertner

It is hereby certified that error appears in the above numbered patent requiring correction and that the said Letters Patent should read as corrected below.

Column 5, line 57, for "-2-propanol" read -- -1-propanol --; column 7, line 58, for "usd" read -- used --; column 9, line 35, for "surcrose" read -- sucrose --; column 11, line 22, for "90 C." read -- 90° C. --; column 15, line 27, for "100° C./4.1 mm." read -- 100° C./0.1 mm. --; column 16, line 59, for "O-[-" read -- O-[3- --.

Signed and sealed this 26th day of February 1963.

(SEAL)
Attest:

ESTON G. JOHNSON
Attesting Officer

DAVID L. LADD
Commissioner of Patents